United States Patent Office 3,486,265
Patented Dec. 30, 1969

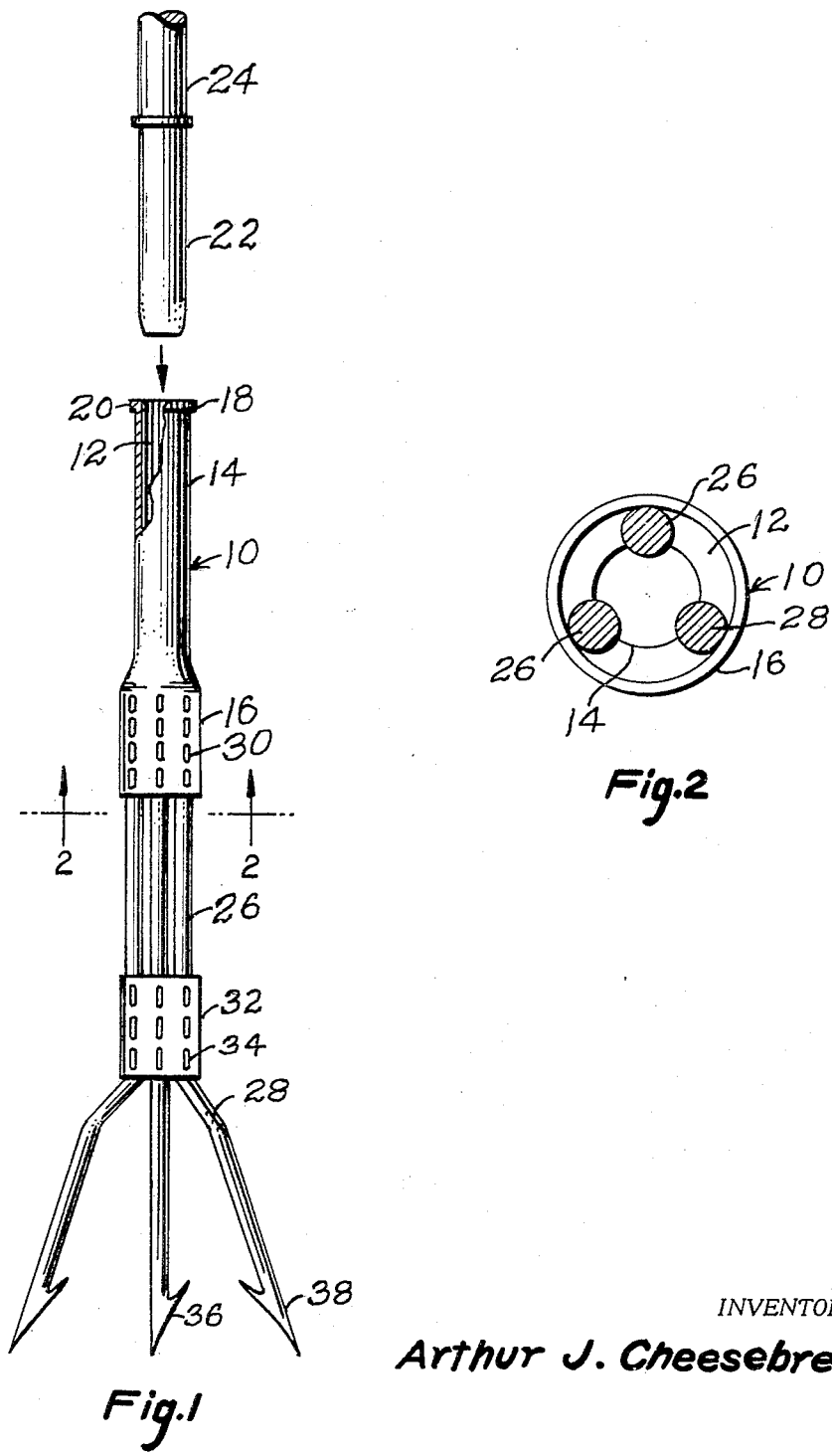

3,486,265
SECTIONAL GIG
Arthur J. Cheesebrew, 1600 Central Ave.,
Columbus, Ohio 43204
Filed Jan. 2, 1968, Ser. No. 695,128
Int. Cl. A01k 81/04
U.S. Cl. 43—6                 1 Claim

ABSTRACT OF THE DISCLOSURE

A sectional gig is provided with a hand grip to the lower end of which are fastened the spear prongs, the shanks of the prongs are spaced and extend through upper and lower ferrules and welded to them. The upper ferrule is upwardly hollow to receive frictionally a plug which in turn is engaged with a sectional reed handle of suitable length.

---

This invention relates to improvements in sectional gigs for use in spear fishing for frogs and fish and similar sports.

An object of the invention is to provide a novel and improved sectional gig for frogs and fish and the like.

Another object of the invention is to provide a novel and improved spear fishing implement in which there is a main body portion to which the spear prongs are securely fastened and project downwardly therefrom, the body portion being also provided with an upwardly open portion forming a socket to receive a piston or plug which in turn is engageable with a sectional reed fishing pole of suitable length for the purpose.

A further object of the invention is to provide a novel and improved spear fishing implement in which there are a number of barbed prongs, the shanks of which extend through and are welded to a lower ferrule, the prongs spreading out apart from each other below the ferrule, there being an upper ferrule in the form of a hollow tube which is compressed to fit the upper ends of the shanks which extend therethrough and are welded to it, so that the intermediate portions of the shanks between the upper and lower ferrules form a hand grip for the user of the device; and in which the upper ferrule is a hollow cylinder into which a plug can be either inserted or otherwise engaged therewith, the plug in turn being secured to a sectional reed pole of any desired length.

Still another object of the invention is to provide a novel and improved sectional gig of the type described, which is formed of only a few parts of simple construction, and which may be made by mass production methods at low cost, and can be expected to be rugged and long lived in use.

These and other objects and advantages of the invention will be apparent from the following description of a preferred embodiment of the invention, as illustrated in the accompanying drawings, forming a part hereof, and in which:

FIGURE 1 is an elevational view of a sectional gig, the view being partly broken out for clarity of illustration, and showing the reed pole plug separated from the main body socket;

FIGURE 2 is a sectional plan view taken substantially on plane 2—2 of FIGURE 1.

In connection with the manufacture and use of sectional gigs and the like fishing implements for frogs and fish, it is important to make the construction as simple as possible, and yet quite rugged so that it can be made at lost cost, and yet will be of a good life expectancy in all conditions of use. The gig should also be easily fitted with a sectional reed pole or the like and of any desired length so that it is convenient to use as needed. The present invention provides such a fishing implement which can be made of several assorted sizes for the intended purposes and at low cost.

In order to understand clearly the nature of the invention, and the best means for carrying it out, reference may be had to the drawings, in which like numerals denote similar parts throughout the several views.

As shown, there is a main body portion 10 in the form of a hollow cylinder with a bore 12, which is smaller at the upper end portion 14, and enlarged at the lower end portion 16, an upper flange being formed at 18 for strength. The upper end portion 14 thus forms an upwardly open socket 20 for the reception of a piston or plug member 22, which may be slightly tapered at its lower end as shown, for easy insertion into the socket 20 so as to be firmly frictionally seated therein. The hollow plug member 22 in turn upwardly open to receive and engage with the lower end of a sectional reed fishing pole 24 shown in fragment in the view. While the fishing pole 24 may be of any suitable length, and all in one piece, it may also be formed of several pole sections which may be engaged to each other by threaded ferules or other fastening means, so as to enable the entire assembly to be stored in a small carton or case for transportation or storage.

The enlarged lower ferrule or tube 16 has inserted therein from below, the upper ends of shanks 26 of the spear prongs 28, and the rods or shanks 26 are welded to the tube 16 by suitable welding, such as a fused weld 30, the tube 16 being compressed to fit the rods 26. As seen in FIGURE 1, there is also a lower sleeve or ferrule 32 through which the shanks of the spear prongs extend, and they are also welded to the ferrule 32 by welds as at 34. Below the lower ferrule 32, it is seen that the spear prongs 28 diverge from each other, being suitably angled for the fish or frogs being hunted. The prongs or tines 28 are provided with suitable barbs 36 at their lower pointed ends 38.

This sectional gig is designed to be portable, as much as any sectional reed fishing pole. The size of the gig determines the size of the pole and fittings. The frog gig has small fittings, cylinder and piston plug which may be about one-half inch in diameter, and different size fish gigs will vary in size, depending on the fish being sought. The reed pole 24 may be either all in one piece, or in sections which are provided with interconnecting threaded ferrules or catches for easy assembly or disassembly for the desired length. This gig is useful not only in frog and fishing activities, but also for use in scuba or skin diving and is very convenient and useful in all these sports.

Although a preferred embodiment of the invention has been described in specific terms, it is understood that various changes may be made in size, shape, materials and arrangement without departing from the spirit and scope of the invention.

I claim:

1. A fishing implement comprising main body means, prong means engaging and being supported by said main body means, said main body means having an upper tubular portion with a body bore extending therethrough to form a socket and a lower tubular portion having an extension of said body bore extending therethrough for the reception of said prong means for secure engagement therewith, a lower ferrule means spaced from said main body means and having a lower ferrule bore formed therethrough for reception of said prong means, the spacing between said lower tubular portion of said main body means and said lower ferrule means being substantial in extent to form a hand grip portion for the user of the implement in grasping the intervening shank portions of said prong means, said prong means comprising a plurality of discrete prong shank portions extending into said lower tubular portion of said main body means and said lower ferrule means and spaced from each other, said lower tubular portion of said main body means and said lower ferrule means being permanently secured to said prong means by welding thereto while supporting said prong means in mutually interspaced relation to each other, operative tine means carried by said prong means and extending therefrom for engagement with prey being hunted, said operative tine means comprising a plurality of tines arranged to diverge from each other angularly with sharp outer ends and barbs carried by and integral with said tines, plug means comprising a hollow plug body releasably engageable within said socket of said main body means and having an upwardly open bore formed therein for reception and engagement with an end of a handle of suitable length to reach the intended prey of the hunter or fisherman.

References Cited

UNITED STATES PATENTS

| | | | |
|---|---|---|---|
| 735,471 | 8/1903 | Crane | 43—118 |
| 796,413 | 8/1905 | Butler | 43—6 |
| 1,621,082 | 3/1927 | Pflueger | 43—6 |
| 2,529,938 | 11/1950 | Hearndon | 294—61 |
| 2,690,925 | 10/1954 | Reis | 294—61 |
| 2,794,668 | 6/1957 | Christensen | 294—61 |

WARNER H. CAMP, Primary Examiner